Sept. 8, 1959

M. COMANOR 2,903,497

ELECTROCHEMICAL CELL

Filed Feb. 25, 1957

INVENTOR:
MILTON COMANOR

BY

AGENT

INVENTOR:
MILTON COMANOR

United States Patent Office 2,903,497
Patented Sept. 8, 1959

2,903,497
ELECTROCHEMICAL CELL

Milton Comanor, New York, N.Y., assignor to Yardney International Corp., New York, N.Y., a corporation of New York Application February 25, 1957, Serial No. 641,911

5 Claims. (Cl. 136—26)

This invention relates to electric batteries and more particularly to those batteries wherein the electrodes of opposite polarities are in close proximity to each other but are separated by an electrochemically neutral electrolyte-permeable element.

As batteries developed it was found that the most efficient cells were those wherein the electrodes were closely packed in a casing. This expedient lowered the internal resistance of the cell but with it came the concomitant drawback of increased tendency to short circuits, occurring as the shapes of the electrodes were altered by the solution and redeposition of the active materials under the influence of repeated charge and discharge. For this reason, many particularly efficient electrochemical couples could not be used in rechargeable cells.

This problem was mitigated to some extent with the advent of low-resistance, semi-permeable separators. The zinc-silver cells, for example, were commercially successful only after the introduction of the semipermeable separator (U.S. Patent No. 2,594,709), but even that and other improvements did not eliminate all the difficulties encountered in the production of a consistently reliable cell of this type with the simple separator systems currently in use.

The present invention has for its principal object the provision of means for improving the performance of alkaline and other rechargeable batteries.

A further object of this invention is to provide an increased number of charge-discharge cycles in the useful life of such batteries.

A still further object is the prevention of growth of the active electrode material across the space between the electrodes.

Another object is the prevention of short circuits between the electrodes by metallic penetration of the separators.

Other and more specific objects of this invention will be apparent as the descripion proceeds.

An important feature of this invention is the interposition between associated positive and negative electrodes of a porous metallic element, not connected in the cell circuit, which is electrolyte-permeable as well as ion-permeable. This metallic electrode or control grid is composed of a metal or an alloy possessing an inherent hydrogen overvoltage lower than the hydrogen overvoltage of the negative electrode.

Gas overvoltage is defined as the polarization voltage required for the evolution of a gas at an electrode. The hydrogen overvoltage of an electrode is the difference between the actual cathode potential for hydrogen evolution and the theoretical equilibrium potential of hydrogen in the same electrolyte.

"Treeing," the phenomenon of crystal growth of active material from the face of the negative electrode, aside from lowering the useful life of the battery is also a relatively frequent cause of battery explosions. When the "tree" penetrates to the opposite electrode, a low-resistance path for the stored electrochemical energy is provided and a short circuit is caused. Since all the plates in a given cell are usually connected in parallel, they tend to discharge their stored energy through the shorted plate. Particularly with cells of large capacity, e.g. several hundred ampere-hours, the areas adjacent the short circuit are quickly brought to red heat. Since considerable quantities of hydrogen and oxygen accumulate within the battery casing as a result of normal battery operation, ignition and explosion of batteries having short-circuited plates as a result of "trees" is potentially a serious hazard. This invention substantially eliminates this hazard.

The basic phenomenon believed to underlie the instant invention is the fact that any metallic surface growths of higher-overvoltage metals from the face of the negative electrodes when in contact with the low-overvoltage, relatively noble metal of the control grid will redissolve in the electrolyte with a release of an equivalent volume of hydrogen. By this action metal penetration between the positive and the negative electrodes will be halted and battery failure due to shorting prevented.

The low-overvoltage cell element of this invention, hereinafter referred to as the control grid, permits the free flow of current producing ions through its body but acts as a barrier to crystal growth which might tend to short-circuit the cell. The low-overvoltage feature of the selected metal or alloy acts to redissolve the crystals of the metal growing from the face of an electrode connected in the circuit.

The overvoltage of the various metals will differ in each of the usual electrolytes, so that no general order or overvoltages for metallic elements can be set forth. Additionally, variation in the type of surface will have an effect on the overvoltage characteristics of certain metals. Generally, it can be stated that the relative order of overvoltage for metals and alloys remains substantially the same in a given system, i.e. acid, alkali or salt solutions. Depending on the concentration of the particular acid, alkali or salt, however, minor transpositions in the relative order of overvoltage are often observed. The addition of salts to acidic or alkaline electrolyte systems may also change the relative order of overvoltages.

Representative tables of overvoltage values can be found in chemical and electrochemical texts, handbooks and reference tables, but in cases where it is necessary to determine the exact relative overvoltage of the materials under consideration the following simplified overvoltage determination procedure will prove useful.

*Procedure*

Figure 1:
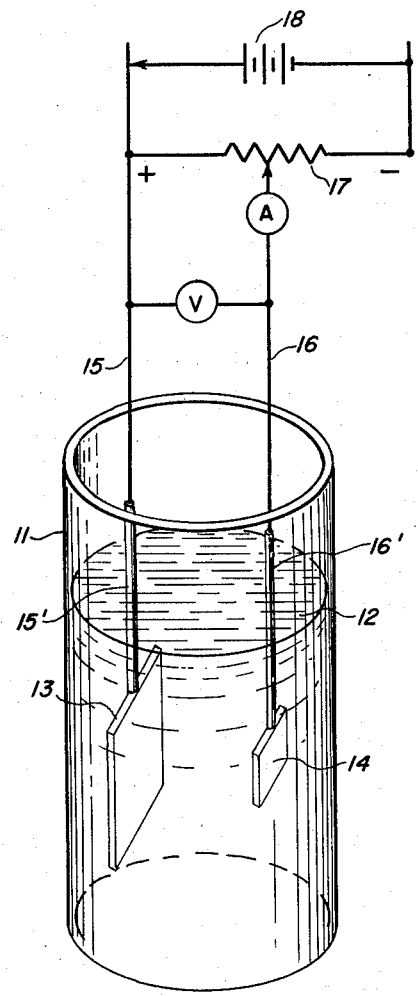
Fig. 1 is a schematic diagram of an apparatus for performing simplified overvoltage determination for purposes of the invention, in various electrolytes and for different metals.
Figure 2:
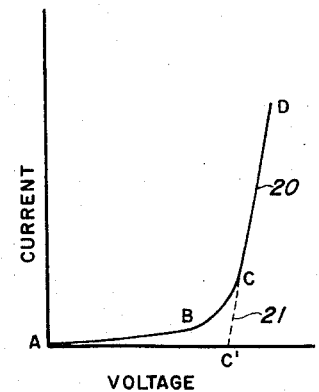
Fig. 2 is a representative curve showing the overvoltage determination by the apparatus of Fig. 1.

The cell illustrated in Fig. 1 is set up as follows: A vessel 11 of suitable capacity is filled with the electrolyte 12 to be tested. A counter-electrode 13, in this case a positive electrode, is positioned in the electrolyte; the size of this electrode should be of the order of at least fifty times the surface area of the test electrode. A test electrode 14, of the material under test in the surface condition being tested, is positioned in the electrolyte in such fashion that its major face is approximately centered with respect to the major face of the counter-electrode; it should be noted that the leads 15, 16 to each of the electrodes should be suitably insulated from the electrolyte by sealed liquid-tight insulation 15', 16' in order to prevent introduction of extraneous factors. The test circuit includes a variable current source, shown schematically as a potentiometer 17 connected across a battery 18, a voltmeter V and an ammeter A whereby, upon a gradual increase of the input voltage derived from the potentiometer, simultaneous readings can be made of the voltage and the current applied across the electrodes. The readings A, B, C, D of current vs. voltage are plotted to yield a curve 20 as shown in Fig. 2. Extrapolation of the almost vertical section of the curve to zero current, as shown by dotted line 21, gives the overvoltage at C'. Careful visual observations are simultaneously made of the surface of the test electrode 14, and voltage corresponding to the occurrence of the first sign of gas bubble evolution is noted. This value, if properly determined, will agree closely with the voltage C' and such observations can serve as a check on the accuracy of the procedure.

The control-grid elements of this invention can be fabricated by several methods each yielding structures satisfactory for certain types of cells. The control grid can consist of a thin layer of porous sintered or flame-sprayed metal either in self-supporting form or adhering to an electrolyte-permeable support.

Metal mesh, metal cloth and expanded-metal foils have also proved excellent as control grids, as have finely perforated metal sheets. Other successful variations embodying this invention include the application of the chosen metal in powder or electro-plate form to the semi-permeable separator elements of the cell and in some cases even to the absorbent inter-separator or "wick" elements.

Other forms of metal application to separators are by means of chemical reduction or vacuum sublimation, or the "sputtering process," cf. Strong, "Procedures in Modern Physics" (John Wiley). The metal particles need not necessarily be welded together or in any way coextensive or conductively connected but the combination of support and metal film must be porous and electrolyte-permeable. The pores of the control grid, in order to provide optimum effect, should preferably be not greater than ten times the minor axis of any of the "treeing" crystals, but successful cells have been built with pores in the control grid as large as fifty times the minor axis of these crystals.

In lead batteries crystal growth is primarily from the face of the negative electrodes. Until this invention the only partially successful method of surface control has been the alloying of the negative plate with various metals. Alloying, however, results in a serious loss of capacity, sluggish operation at low temperature and considerable increase in the internal resistance of the cell.

Antimony (Sb), the most commonly used alloying metal, when alloyed in amounts up to 5%, increases the internal cell resistance by approximately 15%. In addition there is the constant toxic hazard in lead-antimony alloys used in batteries due to the formation of volatile stibine ($SbH_3$) by the liberation of hydrogen during charging. Use of the novel control grids of this invention will make possible elimination of antimony from lead-acid storage batteries.

Lead acid batteries with control grids of this invention fabricated from Monel metal screens had their cycle life prolonged by approximately 25% when put on an overcharge/discharge regimen that produced violent shorting failures in a conventional control cell within one week. It is apparent from existing overvoltage data of "International Critical Tables" that in this type of battery the control grid or electrode might also be made from precious metals, such as silver and gold (e.g. in foil form), or various alloys, for example Monel, duriron and the various nickel-cobalt alloys, so long as the metallic grid material is more noble than the active material of at least the negative electrode.

In silver-zinc alkaline cells subject to an overcharge/discharge regimen stringent enough to cause cell failure after only ten cycles in control cells, cells of this invention with control grids prepared of nickel in woven-fabric, perforated-foil, and sintered-plate form had their cycle life prolonged in each case to a minimum of twenty to twenty-two cycles.

In nickel-zinc cells, placed under special regimen, with an alkaline electrolyte consisting of 33% sodium hydroxide, sintered iron grids prolonged the cell life from an average of fourteen cycles for the controls to an average life of twenty-three cycles for the cells of this invention. Woven screens made of various types of stainless steel gave similar improvement in both silver-zinc and nickel-zinc cells.

In many cases, especially in the case of rechargeable batteries where a danger of growth from the positive plate may exist, it will be desirable to have the control grid composed of a metal whose overvoltage in the electrolyte employed is lower than that of both the positive and the negative electrode material.

Figure 3:
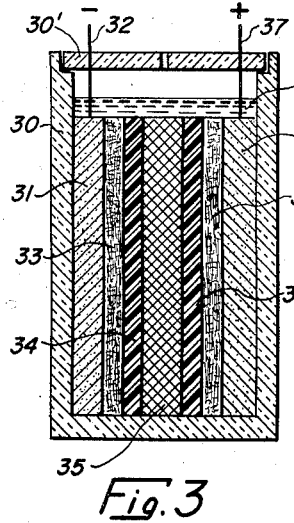
Fig. 3 shows in schematic section, a cell embodying one type of construction according to this invention.

Fig. 3 shows an assembled cell illustrating one aspect of this invention. The electrode assembly of this cell, contained in a casing 30 closed by a cover 30', consists of a negative electrode 31 with terminal lead 32, a positive electrode 36 with terminal lead 37, an electrolyte-distributing wick 33, 33' associated with each electrode, semi-permeable separators 34 and 34', and the control grid 35 of this invention, all disposed below the level of the electrolyte 39 in the casing 30. The entire assembly is held under pressure within the casing 30.

Figure 4:
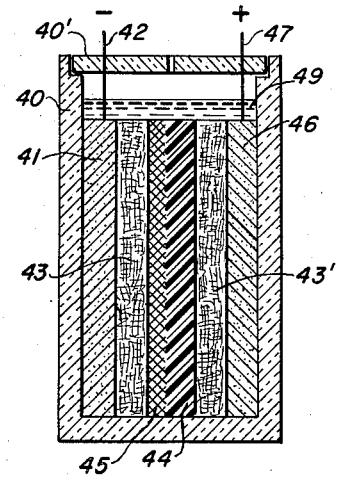
Fig. 4 shows, again in schematic section, a second type of construction embodying this invention.

Fig. 4 shows another aspect of this invention where within the casing 40 and its associated cover 40' there are positioned, below the level electrolyte 49, a positive electrode 46, a negative electrode 41, their associated terminal leads 42 and 47, wicks 43, 43' and a combination control grid which consists of the low-overvoltage metal 35 coated upon the surface of a semi-permeable membrane 44.

It should be understood that the above representations are schematic and that various structural variations may be adopted depending on the particular type cell desired. The wick structures 33, 43 may be entirely dispensed with in cells designed for high rates of discharge having adequate means for circulating the electrolyte to the electrode faces. The semi-permeable separators 34, 44 may be omitted satisfactorily in cells where the reaction products are sufficiently insoluble in the electrolyte or adequate physical separation of the electrodes is provided. The control grid 44 of Fig. 4 may also be deposited directly upon the porous material of the adjacent inter-separator 45. Naturally, any number of cells of the type illustrated in Figs. 3 and 4 may be assembled into batteries.

Figure 5:
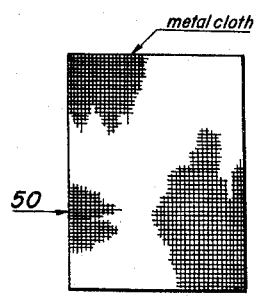
Fig. 5 shows one type of control-grid construction.

Fig. 5 shows a control grid 50 according to this invention where the low-overvoltage metal is fabricated into a woven metallic fabric. This fabric can be in screen form, a knitted mesh or a very-fine-mesh expanded metal.

Figure 6:
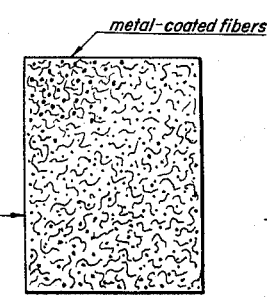
Figs. 6–9 show other control-grid constructions in accordance with this invention.

Fig. 6 shows one type of composite control grid 60 where the metal is deposited on the fibers of a support of absorbent material by any of the common forms of metal deposition. Vacuum sputtering, vacuum condensation, vapor decomposition, chemical deposition, and hydrogen reduction are among the methods suitable for this type of control-grid formation. The support itself may consist of any of the common separator and wick materials used in batteries, e.g. regenerated-cellulose sheets or polyvinyl alcohol sheets, as well as woven or felted inorganic and organic filaments and fibers used as wicks, such as asbestos fabrics and felts, glass wool, cellulose, nylon and the newer organic polymeric fibers.

Figure 7:
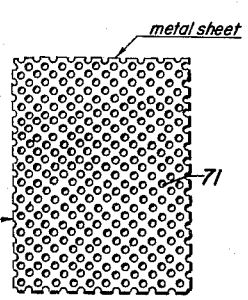

Fig. 7 illustrates a perforated-sheet-metal control grid 70. The grid is fabricated by the perforation of a sheet of the low-overvoltage metal. The perforations 71 will normally be circular but manufacturing expedients may make other types of perforations preferable.

Figure 8:
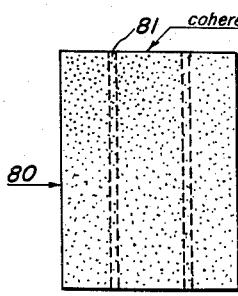

Fig. 8 demonstrates a control grid 80 of a porous, low-overvoltage metal. It may be fabricated by any of the common methods of preparing porous metal such as flame-spraying, sintering or electro-deposition. The flame-sprayed low-overvoltage metal may be self-supporting or may be sprayed onto a support of paper or fabric. This latter may be permitted to remain or may be peeled from the resulting coalesced porous metal surface. The sintered plates may be self-supporting or may contain stiffening members imbedded within the body of the sintered low-overvoltage metal, as indicated at 81. Such stiffening members should, of course, also be of a low-overvoltage metal in order not to reduce the effectiveness of the control grid made with such construction.

Figure 9:
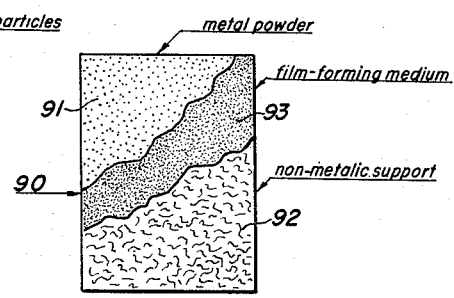

Fig. 9 represents another composite control grid 90 wherein the low-overvoltage metal in the form of a powder 91 is coated on the surface of the support 92. The support, as in the case of the control grid 60 of Fig. 6, can be in a variety of forms and fabricated from diverse materials. As an example of this type of structure Fig. 9 shows the metal powder 91 dispersed in a suitable film-forming medium 93 and the mixture spread or cast upon a supporting surface. For batterias, the film-forming material should, of course, be electrolyte-permeable and preferably form a semi-permeable film upon the supporting surface 92. Excellent film-forming metal-powder-dispersing agents for use in batteries are polyvinyl alcohol and viscose solutions.

The invention is of course not limited to the embodiments described above, some of whose features may be readily changed in form or otherwise modified without thereby departing from the spirit and scope of the appended claims.

I claim:
1. An electrochemical cell comprising an electrolyte, at least one positive and at least one negative electrode, and interelectrode separator means, said separator means including an electrolyte-permeable metallic element more noble than the active material of said negative electrode and having an overvoltage in said electrolyte lower than the overvoltage of said active material, said separator means further including a layer of electrolyte-permeable insulating material interposed between said element and each of said electrodes.

2. A cell according to claim 1, wherein said electrolyte is acidic, said negative electrode contains lead and said metallic element is essentially composed of a material chosen from the group consisting of noble metals and nickel-containing acid-resistant alloys.

3. A cell according to claim 1, wherein said electrolyte is alkaline, said negative electrode containing zinc.

4. A cell according to claim 3, wherein said metallic element is essentially composed of a material chosen from the group consisting of iron, nickel and alloys thereof.

5. A cell according to claim 4, wherein said positive electrode contains silver.

References Cited in the file of this patent

UNITED STATES PATENTS

| | | |
|---|---|---|
| 1,929,923 | Howard et al. | Oct. 10, 1933 |
| 2,271,829 | Powers | Feb. 3, 1942 |
| 2,527,576 | Ruben | Oct. 31, 1950 |

FOREIGN PATENTS

| | | |
|---|---|---|
| 13,749 | Great Britain | of 1902 |